United States Patent [19]

Link

[11] Patent Number: 5,490,307
[45] Date of Patent: Feb. 13, 1996

[54] LATHE

[75] Inventor: Helmut F. Link, Aichwald, Germany

[73] Assignee: Index-Werke GmbH & Co. KG Hahn & Tessky, Esslingen, Germany

[21] Appl. No.: 211,536

[22] PCT Filed: Oct. 14, 1992

[86] PCT No.: PCT/EP92/02367

§ 371 Date: Apr. 5, 1994

§ 102(e) Date: Apr. 5, 1994

[87] PCT Pub. No.: WO93/07981

PCT Pub. Date: Apr. 29, 1993

[30] Foreign Application Priority Data

Oct. 19, 1991 [DE] Germany .......................... 41 34 615.7
Nov. 19, 1991 [EP] European Pat. Off. .......... 91119675

[51] Int. Cl.⁶ .................... B23B 29/32; B23B 7/14
[52] U.S. Cl. .................... 29/27 C; 29/40; 82/121
[58] Field of Search .................... 29/27 R, 27 C, 29/40, 39; 82/120, 124, 129, 121; 483/18, 24, 36

[56] References Cited

U.S. PATENT DOCUMENTS

| | | | |
|---|---|---|---|
| 3,750,244 | 8/1973 | Smith ........................ | 29/40 X |
| 4,571,796 | 2/1986 | Sellner et al. .............. | 29/27 R |
| 4,704,926 | 11/1987 | Boffelli ..................... | 29/40 X |
| 4,785,525 | 11/1988 | Ishida et al. ............... | 483/18 |
| 5,125,142 | 6/1992 | Kosho et al. ............... | 29/27 C X |
| 5,214,829 | 6/1993 | Minagawa .................. | 29/27 C |
| 5,341,551 | 8/1994 | Brown et al. .............. | 29/40 |
| 5,392,501 | 2/1995 | Sonnek ....................... | 29/27 C |

FOREIGN PATENT DOCUMENTS

| | | |
|---|---|---|
| 0185011B | 12/1985 | European Pat. Off. . |
| 3221513C | 6/1982 | Germany . |
| 3702424 | 8/1988 | Germany .................. 29/27 C |
| 5138402 | 6/1993 | Japan ....................... 29/27 R |

*Primary Examiner*—William Briggs
*Attorney, Agent, or Firm*—Edward J. Timmer

[57] ABSTRACT

Lathe with a workpiece spindle (28) defining a Z-axis as well as a tool carrier slide (56) bearing a tool carrier in the form of a tool turret (112) having a turret body and a turret head, the slide being displaceable in the direction of a first axis (X-axis) extending transversely to the Z-axis, whereby workpiece spindle and tool carrier slide are displaceable relative to one another in the direction of the Z-axis, the tool turret is pivotable about a second axis (Y-axis) likewise extending transversely to the Z-axis as well as transversely to the X-axis and the turret head is mounted on the turret body so as to be rotatable about an indexing axis extending transversely to the Y-axis, and with first tool receiving means on the turret head (114) as well as a second tool receiving means (142) mounted on the turret body (110). In order to allow a tool having a high machining capacity to be used in such a lathe at least with no essential risks of collision and with a high degree of manufacturing precision, workpiece spindle and tool turret of such a lathe are arranged so as to be displaceable relative to one another in the direction of the Y-axis and the second tool receiving means is provided on the side of the turret body facing away from the turret head.

28 Claims, 8 Drawing Sheets

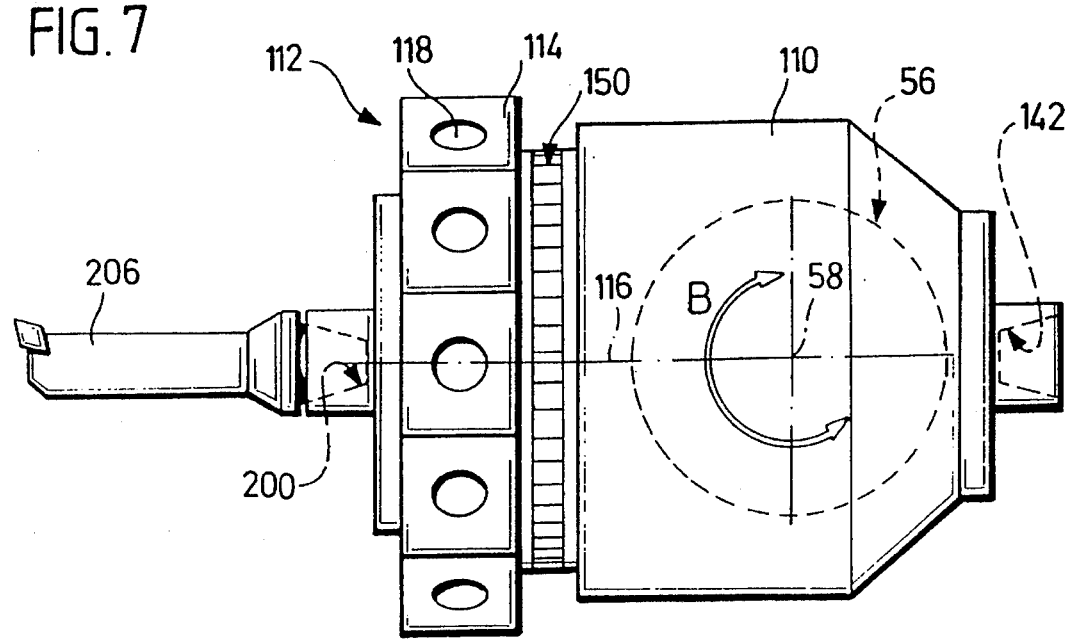
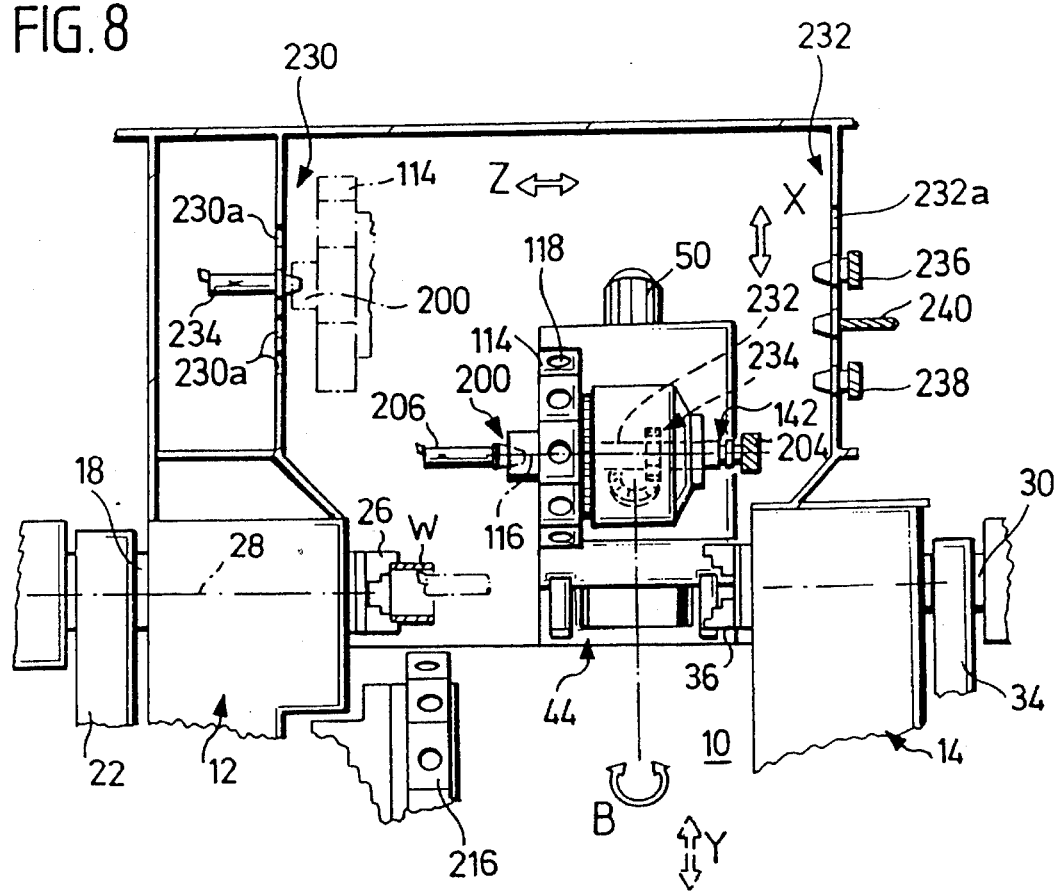

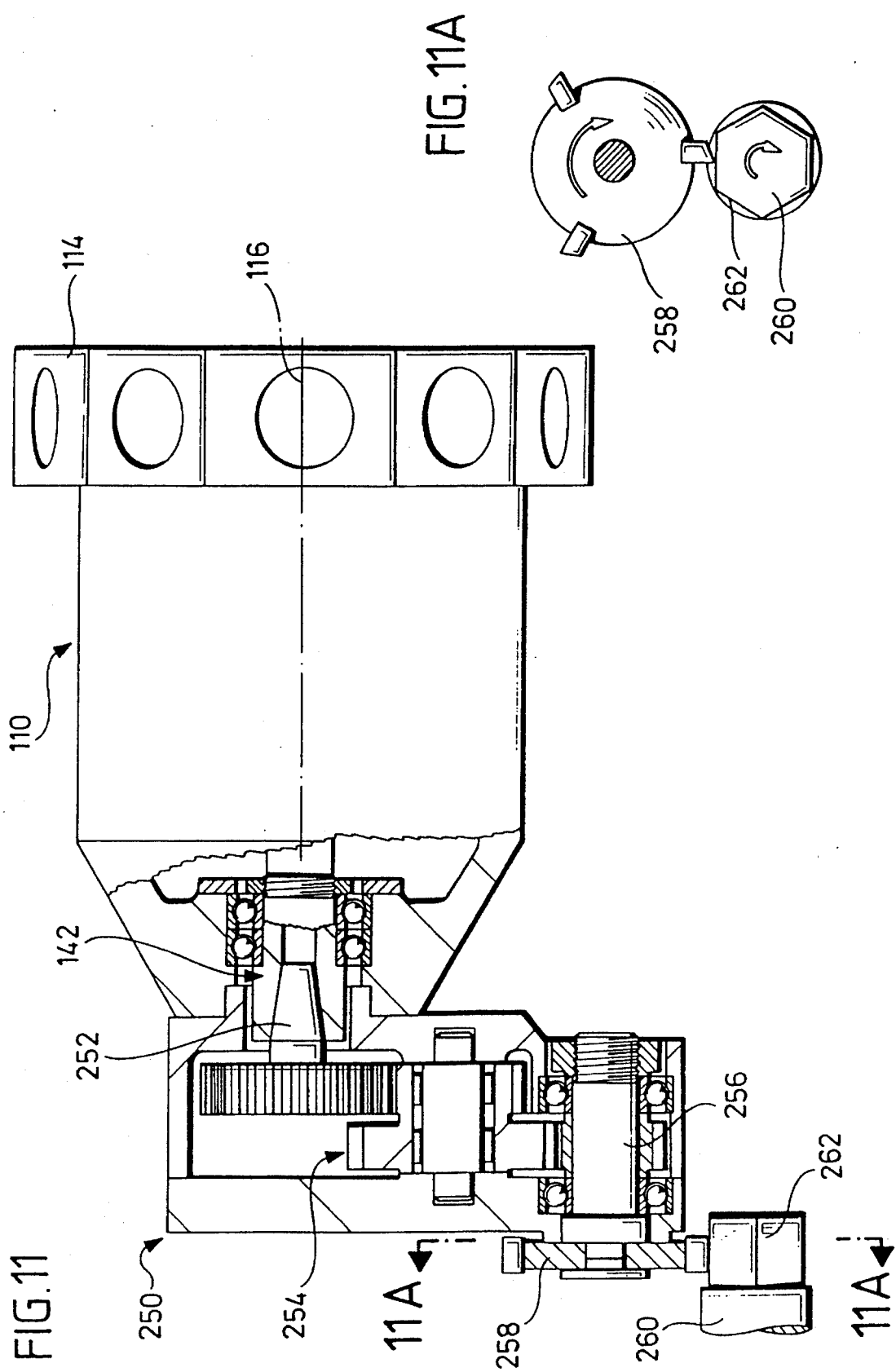

LATHE

The invention relates to a lathe, in particular a CNC lathe, with a workpiece spindle defining a Z-axis as well as a tool carrier slide which bears a tool carrier in the form of a tool turret having a turret body and a turret head and is displaceable in the direction of a first axis (X-axis) extending transversely to the Z-axis, whereby workpiece spindle and tool carrier slide are displaceable relative to one another in the direction of or parallel to the Z-axis.

On account of the requirement that workpieces are to be machinable in a lathe as completely as possible, an increasing number of driven tools are used in the tool turrets of lathes. The machining capacity of these driven turret tools is, however, considerably limited due to the constructional space available in a turret head and the necessarily long drive chain—in known automatic turret lathes a motor mounted on the slide bearing the tool turret drives a central drive shaft which extends concentrically to the indexing axis of the turret head and ends in the turret head where it is provided with a bevel wheel, which meshes with bevel wheels of tool spindles rotatably mounted in the turret head and arranged in star form; on account of the small constructional space available in the turret head, these bevel wheels are, of necessity, relatively small and all the turret tools are driven at the same rotational speed.

For driven tools having a high machining capacity, it was therefore decided to provide a tool carrier with only one drivable tool spindle instead of a tool turret. This does, however, have the disadvantage that a tool change has to be made after each operation, which leads to an unfavorable ratio between machining times and idle periods, in which workpieces cannot be machined.

Typical for the last construction trend mentioned above is the lathe according to EP-0 259 637-B which has a headstock for mounting a workpiece spindle which is displaceable in the direction of the Z-axis and a tool carrier slide which, for its part, is borne by a lower slide displaceable in the direction of the X-axis. The tool carrier slide designed as a sleeve-guided slide is displaceable in the lower slide in the direction of the Y-axis, which is at right angles to the plane defined by the X-axis and the Z-axis, and mounted for rotation about the Y-axis so that the tool carrier mounted on the tool carrier slide has a B-axis. A drivable tool spindle, e.g. for a milling tool, is mounted in this tool carrier such that the spindle axis extends transversely to the Y-axis. Above the cross-slide system formed by the lower slide and the sleeve-guided slide, this known lathe has a tool magazine with which a tool changer is associated in order to be able to change the tool held in the tool spindle after the tool carrier has been swivelled through 180° about the B-axis or Y-axis.

EP-0 185 011-B discloses an automatic turret lathe, the turret head of which has at least one tool receiving means for a driven tool, in particular a milling tool. The purpose of this known lathe is to replace a true Y-axis of a tool carrier slide system by a swivelling of the tool turret about a B-axis, coordinated with a transverse feed, and/or a rotation of the turret head about its indexing axis. For this purpose, the tool turret is arranged on a cross-slide system having a Z-axis and an X-axis, a turret body is mounted on the upper slide of this cross-slide system so as to be pivotable about the Y-axis and consequently has a B-axis, and the turret head is held on the turret body so as to be rotatable about an indexing axis (A-axis) extending transversely to the Y-axis. This known lathe therefore has the disadvantage mentioned at the outset, i.e. that only tools having a relatively small machining capacity can be accommodated in the turret head. In addition, a non-driven tool having a high machining capacity, such as, e.g., a boring bar, which is mounted on a turret head, can also not be completely satisfactory because the high forces occurring at such a tool prevent the manufacture of very precise workpieces—in this connection it must be borne in mind that such a turret head must be held on the turret body so that it is not only rotatable about its indexing axis but, normally, also displaceable in the direction of the indexing axis because the turret head must be lockable on the turret body against any unintentional rotation. This is generally accomplished with two crown gears which intermesh when the turret head is locked and are separated from one another when the turret head is rotated due to a displacement of the latter in the direction of its indexing axis.

Finally, an automatic turret lathe is known (DE-32 21 513-C), the turret head of which is equipped only with non-drivable lathe tools and the turret body of which is provided with a drive motor for drivable tools held by the turret body. In this known lathe, the turret body is arranged on a cross-slide system having an X-axis and a Z-axis, the indexing axis of the turret head normally extends parallel to the Z-axis, a first tool spindle, which is normally aligned parallel to the X-axis and drivable by the drive motor, is mounted in the turret body and, finally, an auxiliary unit is articulated to the turret body and a second tool spindle extending parallel to the indexing axis of the turret head in the operating position of this additional unit is mounted therein. The first tool spindle, which is mounted in the turret head and aligned with the driven shaft of the drive motor, extends transversely to the indexing axis of the turret head and a tool held thereby must be removed in order to be able to swivel the auxiliary unit out of a rest position, in which it is located on the side of the turret body facing away from the turret head, through 180° about an indexing axis extending at right angles to the X-axis and the Z-axis into its operating position, in which it is located next to the turret head, whereby a tool held by the second tool spindle—when seen from the turret head—points in the same direction as the turret head. In the operating position of the auxiliary unit, a miter gear arranged therein is coupled with the first tool spindle for driving the second tool spindle. Finally, the turret body of this known lathe is mounted on the upper slide of its cross-slide system so as to swivel about an axis which extends at right angles to the plane defined by the X-axis and the Z-axis. The disadvantage of this known lathe is not only that considerable idle periods, within which no work can be done, are unavoidable when work is intended to be done with the auxiliary unit, but also the limitations in the machining precision during operation with the auxiliary unit which are caused by the way in which the auxiliary unit is attached. In addition, there are limitations in equipping the turret head with tools, e.g. for the reason that the auxiliary unit is located next to the turret head in its operating position and, consequently, the turret head cannot be equipped with tools extending radially to the indexing axis of the turret head.

The object underlying the invention was to create an automatic turret lathe which provides the possibility of operating in an extremely precise manner with tools having a high machining capacity while avoiding long idle periods.

Proceeding on the basis of a lathe such as that shown in DE-32 21 513-C, i.e. from a lathe of the type mentioned at the outset, in which the tool turret can be swivelled about a second axis (Y-axis) likewise extending transversely to the Z-axis as well as transversely to the X-axis and the turret head is mounted on the turret body so as to be rotatable about an indexing axis extending transversely to the Y-axis and which is provided with first tool receiving means on the turret head as well as a second tool receiving means mounted on the turret body, this object may be accomplished in accordance with the invention in that the second tool receiving means is arranged on the turret body such that a tool held by this second tool receiving means points away from the turret head. This results, inter alia, in the following advantages: A tool held by the second tool receiving means is ready for use after a simple swivelling of the turret body and it allows machining to be carried out with considerably greater precision than a tool of an auxiliary unit pivotally attached to the tool body. Owing to the inventive arrangement of the second tool receiving means a tool held thereby does not lead either to restrictions in the tools equipping the turret head or to the risk of a collision between workpiece, working spindle or headstock, on the one hand, and tools, on the other hand, when work is carried out with turret head tools or with a tool held by the second tool receiving means. The arrangement of the second tool receiving means on the turret body allows work to be carried out with a tool having a high machining capacity, in particular a higher machining capacity than that of a tool held by the turret head, without any loss in machining accuracy. Finally, the invention makes it possible, in lathes having a so-called counterspindle, i.e. in lathes having a second workpiece spindle located opposite the first workpiece spindle in the direction of the Z-axis, to machine a workpiece held by the one workpiece spindle with the tools of the turret head and, simultaneously, a workpiece held by the other workpiece spindle with a tool held by the second tool receiving means.

The second tool receiving means is preferably arranged on the side of the turret body facing away from the turret head; in principle, it would also be possible to provide the second tool receiving means on a side of the turret body adjacent the side of the turret body facing the turret head and to orient it such that a tool held thereby points away from the turret head.

As in known automatic turret lathes, the tool carrier slide of the inventive lathe or its headstock bearing the workpiece spindle need not necessarily be movable in the direction of the Y-axis since the tool turret can be arranged such that a first tool receiving means located in operating position and the indexing axis define a plane, in which the workpiece spindle axis is also located. The inventive lathe does, however, allow more diverse machinings when workpiece spindle and tool turret are displaceable relative to one another in the direction of or parallel to the Y-axis.

In order to be able to work with a tool, which is held by the second tool receiving means, both axially and radially (in relation to the axis of rotation coinciding with the Z-axis) and to use the turret head both as a so-called star turret as well as a so-called disk turret, the tool turret should be pivotable about the Y-axis through at least 90°.

In a preferred embodiment of the inventive lathe, the second tool receiving means is provided with a drive for a drivable tool. The inventive lathe can, therefore, be equipped with, for example, a heavy milling spindle. In this connection attention is drawn to the fact that in comparison with driven tools held by the turret head the drive chain for the second tool receiving means has at least one deflection (miter gear) less since driven tools held by the turret head are always arranged in the region of the periphery of the turret head and a drive shaft associated with the turret head for driving its tools must extend coaxially to the indexing axis of the turret head.

If the inventive lathe has a turret head with at least one first tool receiving means provided with a drive for a drivable tool, embodiments are then recommended, in which a common drive motor is provided for all the drivable tools so that both a tool held by the second tool receiving means as well as the tool or tools of the turret head can be driven with this motor.

If the inventive lathe has not only at least one drivable tool on the turret head but also a drivable second tool receiving means, it is advantageous for the drive for the second tool receiving means to have a higher torque than the drive for the first tool receiving means, which can be achieved either with two corresponding drive motors or with a common drive motor and corresponding gear elements.

In an inventive lathe having only one workpiece spindle, the headstock could be displaceable in the direction of the Z-axis. An embodiment is, however, more advantageous, because it is simpler, above all, with a view to the drive for the workpiece spindle, in which the tool carrier slide is displaceable parallel to the Z-axis. The same applies to the displaceability of workpiece spindle and tool turret in the direction of the Y-axis relative to one another and so in preferred embodiments of the inventive lathe the tool carrier slide is displaceable in the direction of or parallel to the Y-axis—in this connection it is to be noted that lathes having a headstock displaceable in the direction of the Y-axis are known.

The present invention results in particular advantages when used on so-called counterspindle machines. A preferred embodiment of the inventive lathe is therefore characterized by the fact that a second workpiece spindle is located opposite the first workpiece spindle in the direction of the Z-axis, whereby the spindle ends provided with workpiece clamping devices face one another and that the workpiece spindles are displaceable relative to one another in the direction of the Z-axis such that a workpiece held by one of the workpiece spindles can be taken over by the other workpiece spindle. In this respect, both workpiece spindles or their headstocks can be displaceable in the direction of the Z-axis. However, it is sufficient for this to apply to only one of the two workpiece spindles, above all when the tool carrier slide is displaceable in the direction of the Z-axis. As is already apparent from the above comments, it is possible with such an inventive lathe to machine a workpiece held by the one workpiece spindle with tools of the turret head and a workpiece held by the other workpiece spindle with a tool of the second receiving means without any pivoting of the tool turret being required for this.

It is suggested, above all for counterspindle machines designed according to the invention, that a second tool carrier be arranged opposite the first tool carrier with respect to the Z-axis because this allows a whole series of advantages to be achieved: A first workpiece can be transferred from the first workpiece spindle to the second workpiece spindle and then be machined with the aid of the tool turret designed in accordance with the invention while, at the same time, a second workpiece then held by the first workpiece spindle is machined with the aid of the second tool carrier; the turret head of the tool turret can be provided with a so-called synchronous spindle in order to hold the front end of a workpiece which is held in the first workpiece spindle and has already been machined while this workpiece is severed from a stock rod with a tool of the second tool carrier; finally, a workpiece held by the first workpiece spindle can be machined with a tool held by the second tool receiving means of the tool turret, i.e. by means of a stationary boring bar, while, at the same time, turning work is carried out at the outer periphery of the workpiece with a tool of the second tool carrier. The above comments show that a second tool carrier also results in advantages when an inventive lathe is not designed as a counterspindle machine, i.e. only has one single workpiece spindle available. With respect to the second tool carrier slide, this could only be a so-called parting slide, i.e. a slide which is displaceable only in the direction of the X-axis; embodiments are, however, more advantageous, in which the second tool carrier is arranged on a second tool carrier slide which is displaceable parallel to the Z-axis as well as parallel to the X-axis.

If an inventive lathe is designed as a counterspindle machine and provided with two tool carriers in accordance with the preceding comments, an embodiment is recommended, in which the two tool carrier slides are adapted to be moved up to each of the tool workpiece spindles, i.e.—when seen from the front—can pass one another in the direction of the Z-axis, because in this case machining can be carried out at each of the two workpiece spindles with each of the two tool carriers.

Above all in the case of inventive lathes designed as counterspindle machines, it is of advantage for the tool turret to be pivotable about the Y-axis through at least 180° because in this case both the tools of the turret head and a tool held by the second tool receiving means can be used not only axially but also radially at each of the two workpiece spindles.

Since, in an inventive lathe, the tool turret can be pivoted about the Y-axis, the second tool receiving means arranged on the turret body could be aligned at an angle to the indexing axis of the turret head, e.g. form any optional angle with the indexing axis between 0° and 90°. Both in the sense of avoiding the risk of collision and also for simplifying the drive of a tool held by the second tool receiving means, it is, however, of advantage for the second tool receiving means to be aligned in the direction of the indexing axis, whereby the second tool receiving means can also be radially offset in relation to the indexing axis; in any case, a tool held by the second tool receiving means, such as, e.g., a drill, is then aligned in the direction of the indexing axis or parallel thereto. Above all when the turret head is provided with at least one first tool receiving means for a drivable tool, the inventive lathe is advantageously designed such that the second tool receiving means is centered on the indexing axis since its axis is then aligned with the axis of the drive shaft for the turret head tool and, therefore, the drive can be constructed particularly simply by means of a common drive motor.

When, in an inventive lathe, the tool carrier slide is intended to be displaceable in the direction of the X-axis, the Z-axis and the Y-axis, it is recommended in order to achieve as rigid a construction as possible that the lathe be constructed such that the first tool carrier slide is designed as a sleeve-guided slide guided on a cross-slide system for displacement in the direction of the Y-axis and mounted for rotation about the Y-axis although, of course, the tool carrier slide could also be displaceably guided on a normal slide guideway of the upper slide of a cross-slide system, this slide guideway extending in the direction of the Y-axis.

If a turret head is provided with a long tool, in particular a long boring bar, this can lead to a risk of collision because when the turret head is indexed, i.e. the turret head rotated about its indexing axis, such a tool held in the region of the periphery of the turret head (as is customary for turret tools) can collide, for example, with the headstock when the turret head is indexed further. In order to remedy this, it is suggested in accordance with an advantageous further development of the invention that a third tool receiving means be provided at least approximately in the center of the turret head or of a region of the turret body located in the center of the turret head. This third tool receiving means is, in particular, centered on the indexing axis although the axis of this third tool receiving means could also form an acute angle with the indexing axis because the tool turret is pivotable about the Y-axis. The risk of collision specified above is far less or non-existent for a tool held by such a third tool receiving means because, when the turret head is indexed further, a tool held by the third tool receiving means, such as, for example, a boring bar, does not carry out any movement when the third tool receiving means is centered on the indexing axis. A drive for a drivable tool could also be associated with this third tool receiving means but embodiments are preferred in which the third tool receiving means is non-rotatably arranged on the turret head, i.e. is provided for non-drivable tools, such as, for example, a boring bar.

In embodiments of the inventive lathe, in which a drive is associated with the second tool receiving means, the latter is expediently designed as a drive coupling means for an auxiliary unit securely attachable to the turret body and having a drivable tool; such an embodiment should not be confused with the lathe according to DE-32 21 513-C since, in this known lathe, the auxiliary unit is pivotally attached to the turret body, quite apart from the fact that in this known lathe the drive coupling means for the auxiliary unit is not arranged at the side of the turret body facing away from the turret head. The auxiliary unit of the inventive lathe can, in particular, be a multi-sided rotary or thread milling device. If the inventive lathe is designed as a counterspindle machine, it is recommended that the construction be configured such that the auxiliary unit can be attached to the turret head in two positions offset through 180° in relation to the axis of the second tool receiving means in order to create the possibility of being able to machine not only at the one workpiece spindle but also at the other workpiece spindle with the auxiliary unit.

In a preferred embodiment, the drive motor for driving a tool held by the second tool receiving means and/or a tool held by the turret head is connected with the turret head via at least one actuatable coupling for rotating the turret head about the indexing axis and/or swivelling the tool turret about the Y-axis in order to be able to drive the tool as well as rotate or index the turret head about its indexing axis and/or swivel the tool turret about the Y-axis with a single drive motor.

In principle, it would be possible to prevent the tool turret from swivelling in an undesired manner by its drive serving to swivel the tool turret about the Y-axis while work is being carried out with a tool held by the turret head and/or with a tool held by the second tool receiving means. However, with a view to the high precision aimed at in workpiece machining embodiments are recommended which have an actuatable blocking device for preventing any swivelling of the tool turret about the Y-axis, whereby such a blocking device can be constructed in a similar manner to the known blocking devices for locking a turret head on the turret body.

If the drive motor is to serve not only to drive a drivable tool carried by the turret head but also to drive a tool held by the second tool receiving means, the drive motor could be mounted on the turret body; however, this is often not expedient for reasons of space, above all when the drive motor is intended to have a relatively high power in order to drive a tool with a high machining capacity which is held by the second tool receiving means. For this reason, the drive motor in a preferred embodiment of the inventive lathe is in drive connection with a drive shaft located in the Y-axis, the first and the second tool receiving means being drivable via the drive connection as well as via gear wheels. The drive motor can then be installed at a distance from the tool turret on the tool carrier slide or, for example, on that slide, on or in which the tool carrier slide bearing the tool turret is displaceably guided.

For reasons of the desired high machining capacity of a tool held by the second tool receiving means, it is recommended for inventive lathes, in which a common drive motor serves to drive one or several tools held by the turret head and the tool held by the second tool receiving means, that the drive chain between drive motor and tool receiving means be constructed such that the transmission ratio between second and first tool receiving means is at least 2 and preferably greater than 2.

Since, in an inventive lathe, the tool turret can be swivelled about the Y-axis, it can, in a preferred embodiment of the lathe, cooperate with a tool magazine so that an automatic tool change can take place in a simple manner in this way. For this reason it is recommended that the second tool receiving means and, if present, the third tool receiving means each be provided with a tool clamping device and that a tool magazine be provided which is approachable by the first tool carrier slide so that the tool turret can fetch its tools itself from the tool magazine and return them to it. When the tool magazine is of a suitable design, a tool gripping means is no longer necessary for gripping a tool deposited in the tool magazine and inserting the tool into the relevant tool clamping device or for the reverse procedure.

Fundamentally, and this applies to preferred embodiments of the inventive lathe, it is sufficient for the tool turret to be brought, by swivelling about the Y-axis, into several specified and predetermined operating positions and then to be prevented from swivelling unintentionally about the Y-axis, in particular, by an actuatable blocking device. It is, however, also within the scope of the present invention for the tool turret to have a true B-axis, i.e. it can be swivelled continuously and in a controlled manner about the Y-axis during a machining procedure.

It is known in lathes to construct the drive and the control of the workpiece spindle such that the latter can be rotated continuously slowly and controlled as to its angle of rotation, i.e. has a so-called C-axis. A preferred embodiment of the inventive lathe has not only such a so-called C-axis but also an equivalent fitting (so-called A-axis) for the second tool receiving means, i.e. this embodiment is characterized by control means for the continuous and controlled rotary drive of the second tool receiving means as a function of a continuous and controlled rotation of the workpiece spindle. Such a lathe enables gear wheels and the like to be produced by means of hob-type milling.

Additional features and advantages of the inventive lathe result from the following description as well as the attached drawings of several particularly advantageous embodiments, and in the drawings:

FIG. 7 is a plan view onto the tool turret illustrated in FIG. 6, seen in the direction of arrow "E" in FIG. 6, whereby the third tool receiving means has been equipped with a rod-shaped lathe tool for turning an inner diameter of a workpiece;

FIG. 8 is part of a front view of a third embodiment of the inventive lathe which is equipped in accordance with the invention with two tool magazines for supplying the second and third tool receiving means of the tool turret;

FIG. 11 is a part section through a fourth embodiment of the tool turret with attached auxiliary unit which is designed as a multi-sided rotary device, and FIG. 11A is a section according to line 11A—11A in FIG. 11.

Figure 1:
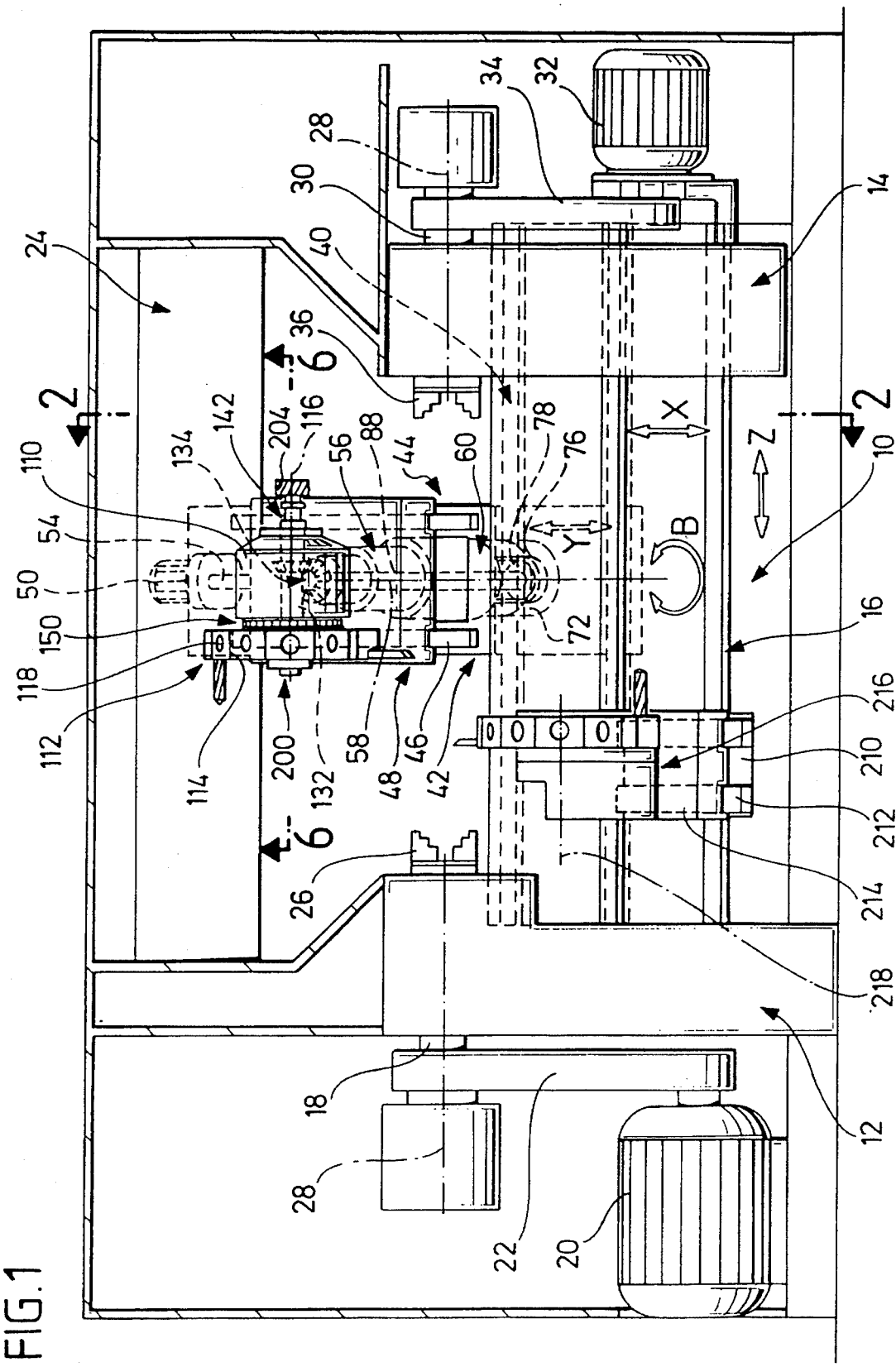
FIG. 1 is a front view of a first preferred embodiment of the inventive lathe which is designed as a counterspindle machine, whereby the axial distance (distance in the direction of the Z-axis) between the two headstocks has, however, been shortened.
Figure 2:
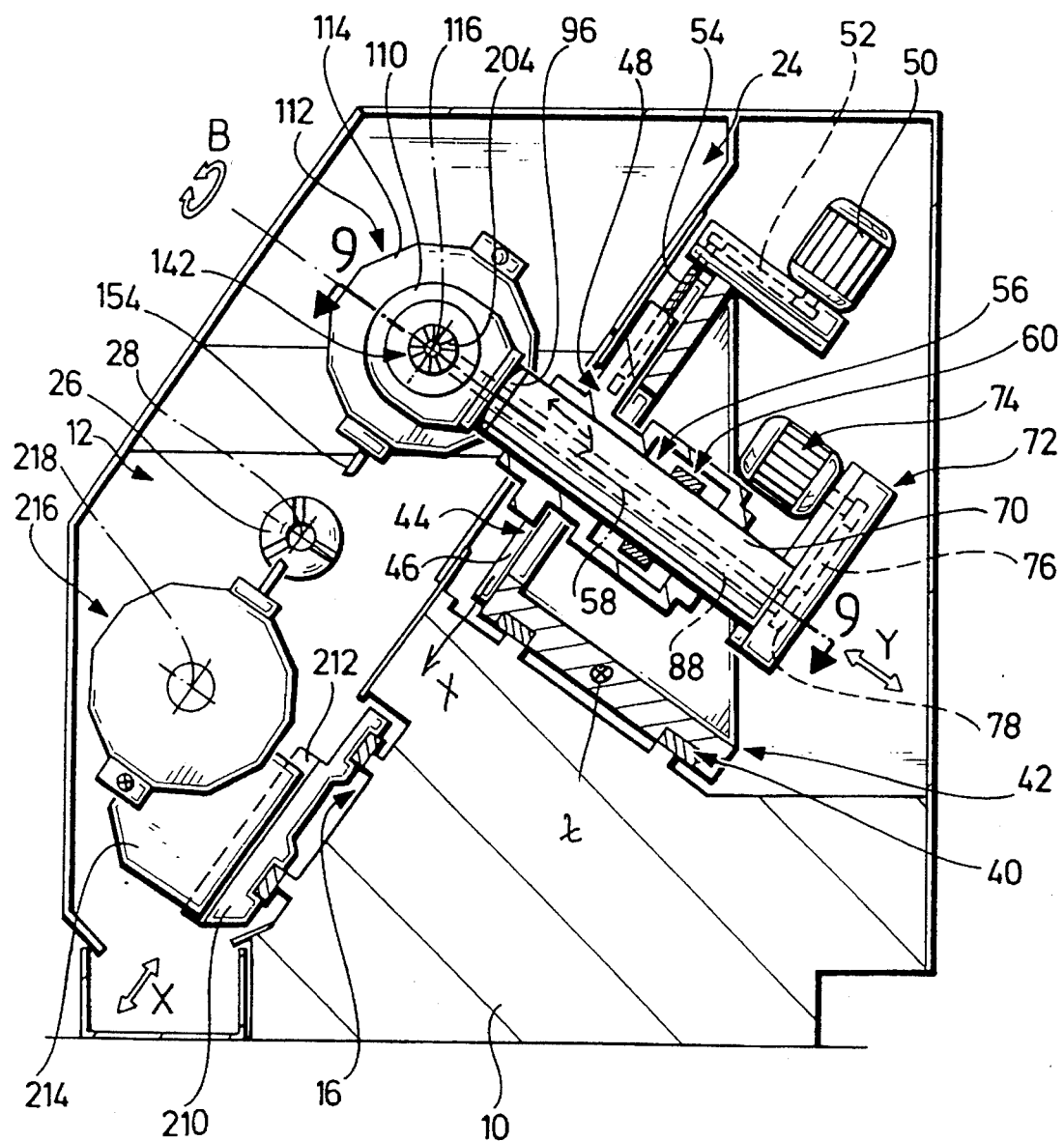
FIG. 2 is a section through this lathe according to line 2—2 in FIG. 1.

The lathe illustrated in FIGS. 1 and 2 is a so-called sloping bed machine having a machine bed 10, on which a first headstock 12 is securely arranged and a second headstock 14 is arranged for displacement in the direction of the Z-axis; for this purpose the machine bed 10 is provided with a Z-guide 16. A first workpiece spindle 18 is rotatably mounted in the headstock 12; this spindle is driven by a stationary motor 20, e.g. via a toothed belt 22, and is provided at its end facing a working space 24 of the lathe with a workpiece clamping device 26 designed as a chuck. The axis 28, about which the workpiece spindle 18 can be turned, represents the axis of rotation of the lathe and therefore defines the Z-axis.

A second workpiece spindle 30 is rotatably mounted in the second headstock 14, whereby the axis of this second workpiece spindle coincides with the axis of rotation 28. A motor 32 is mounted on the headstock 14 and this drives the second workpiece spindle 30, e.g. via a toothed belt 34. Means for displacing the second headstock 14 in the direction of the Z-axis have not been illustrated for the sake of simplicity. At its end facing the working space 24 the second workpiece spindle 30 also bears a workpiece clamping device 36 so that a workpiece first held by the first workpiece spindle 18 and thereby machined can be taken over into the second workpiece spindle 30 by the headstock 14 being moved to the left according to FIG. 1, the workpiece clamped in the workpiece clamping device 36 and the clamping device 26 opened, whereupon the headstock 14 is moved back to the right according to FIG. 1. The first workpiece spindle 18 can, for example, be designed as a hollow spindle in order to be able to machine bar stock in the lathe which is supplied from the left according to FIG. 1.

As is best apparent from FIG. 2, a second Z-guide 40 is arranged on the machine bed 10 and a lower slide 42 of a cross-slide system designated as a whole as 44 is guided on this lower slide for displacement in the direction of the Z-axis. Drive means for displacing the lower slide 42 along the Z-guide 40 have not been illustrated. The lower slide 42 bears guide rails 46 which extend in the direction of the X-axis running transversely to the Z-axis and serve to guide an upper slide 48 of the cross-slide system 44. A motor 50 borne by the lower slide 42 serves to displace the upper slide 48 and drives via a toothed belt 52 a threaded spindle 54 mounted on the lower slide 42 so as to be rotatable but not displaceable; the latter extends in a nut attached to the upper slide 48 and not illustrated such that a rotation of the threaded spindle 54 results in a displacement of the upper slide 48 in the direction of the X-axis.

Figure 9:
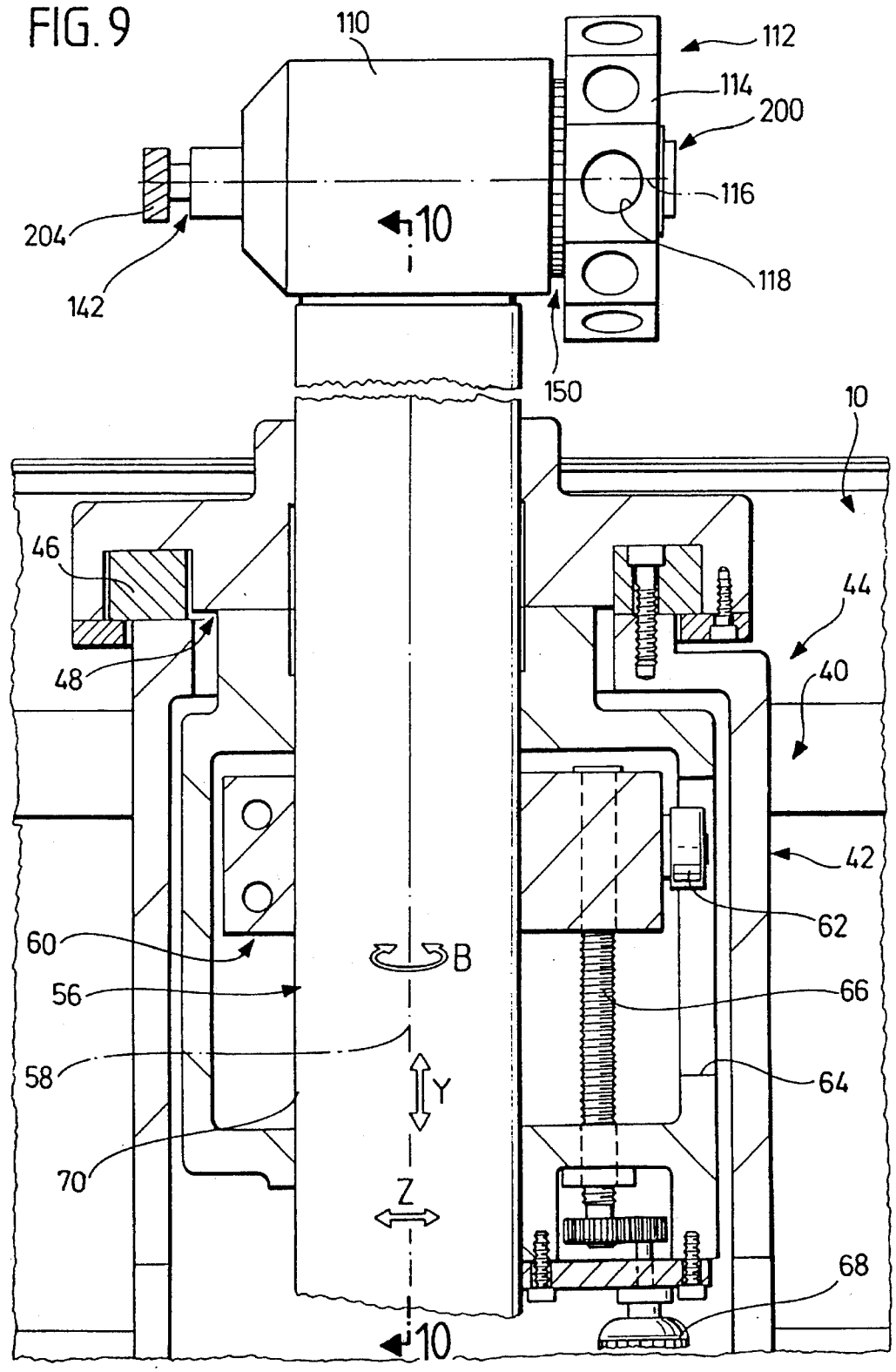
FIG. 9 is an illustration, partially as a sectional view, of part of the slide system bearing the tool turret in the lathe according to FIGS. 1 and 2.

A tool carrier slide 56 designed as a sleeve-guided slide is mounted in the upper slide 48 such that it can be displaced in the direction of an axis designated as 58, which extends transversely to the Z-axis as well as the X-axis and consequently defines a Y-axis. Drive means, with which this displacement is accomplished, are illustrated in FIG. 9 and so in the following reference is made to this Figure. A yoke 60 is secured to the tool carrier slide 56; this yoke is supported with at least one roller 62 in at least one longitudinal slot 64, which extends in the direction of the Y-axis 58, of the upper slide 48 and forms a nut, which is not illustrated, for a threaded spindle 66 mounted in the upper slide 48 so as to be rotatable but non-displaceable. This threaded spindle is driven by means of a motor 68 secured to the upper slide 48. A rotation of the threaded spindle 66 therefore brings about a longitudinal displacement of the tool carrier slide 56 in the direction of the Y-axis.

It will now be explained on the basis of FIGS. 2 and 10 which elements are provided at and in the interior of the tool carrier slide 56 designed as a sleeve-guided slide. The actual tool carrier slide consists of a cylindrical hollow body 70, at the lower end of which a hollow bracket 72 is attached. This, again, has a drive motor 74 secured to it which drives a drive wheel 78 via a toothed belt 76 extending in the interior of the bracket 72. The drive wheel is arranged concentrically to the Y-axis 58 and mounted with a bearing 80 in a bushing 82, which is secured to the hollow body 70, so as to be rotatable but axially non-displaceable. In addition, a hollow shaft 84 of a tool turret still to be discussed is mounted in the hollow body 70 so as to be rotatable concentrically to the Y-axis 58 and displaceable along it, and this shaft serves together with a bearing 86 to mount the one end of a drive shaft 88 which is non-rotatably connected to the drive wheel 78 by means of splines 90, whereby the drive shaft 88 may, however, be displaced axially in relation to the drive wheel 78. The turret shaft 84 is surrounded by a ring piston 92 which is held on the turret shaft 84 so as to be secured against any longitudinal displacement and protrudes into a circular cylinder chamber 94 formed by the bushing 82 so that, together with pressure-medium connections which are not illustrated, the bushing 82 and the ring piston 92 form a double-acting pressure-medium cylinder, with the aid of which the turret shaft 84 can be displaced upwards in accordance with FIG. 10 out of a locked position illustrated in FIG. 10 into an unlocked position as well as locked again by lowering. A plate 96 penetrated by the drive shaft 88 is secured to the upper end, according to FIG. 10, of the turret shaft 84 and a first toothed ring 98 is secured to this plate. A second toothed ring 100 is part of the bushing 82 or secured thereto, and the two toothed rings 98 and 100 form a so-called HIRTH tooth system 102 which intermeshes in the state illustrated in FIG. 10 so that the toothed ring 98 and, with it, the plate 96 and the turret shaft 84 cannot be turned. If, on the other hand, the toothed ring 98 is lifted upwards, according to FIG. 10, off the toothed ring 100 with the aid of the ring piston 92, the turret shaft 84 is unlocked, i.e. it can be turned about the Y-axis 58; at the same time, the two toothed rims 104 and 106 of a coupling 108, which is provided, on the one hand, on the drive wheel 78 and, on the other hand, on the turret shaft 84, mesh with one another so that the turret shaft 84 can be turned due to rotation of the drive wheel 78 about the Y-axis 58. Since the drive shaft 88 is also displaced in the direction of the Y-axis 58, together with the turret shaft 84, the construction could be designed, in a modification of the embodiment illustrated in FIG. 10, such that when the turret shaft 84 is unlocked and the coupling 108 is in engagement the drive shaft 88 is no longer coupled to the drive wheel 78, for example, because the splines 90 of the drive shaft 88 no longer engage in the drive wheel 78.

Figure 10:
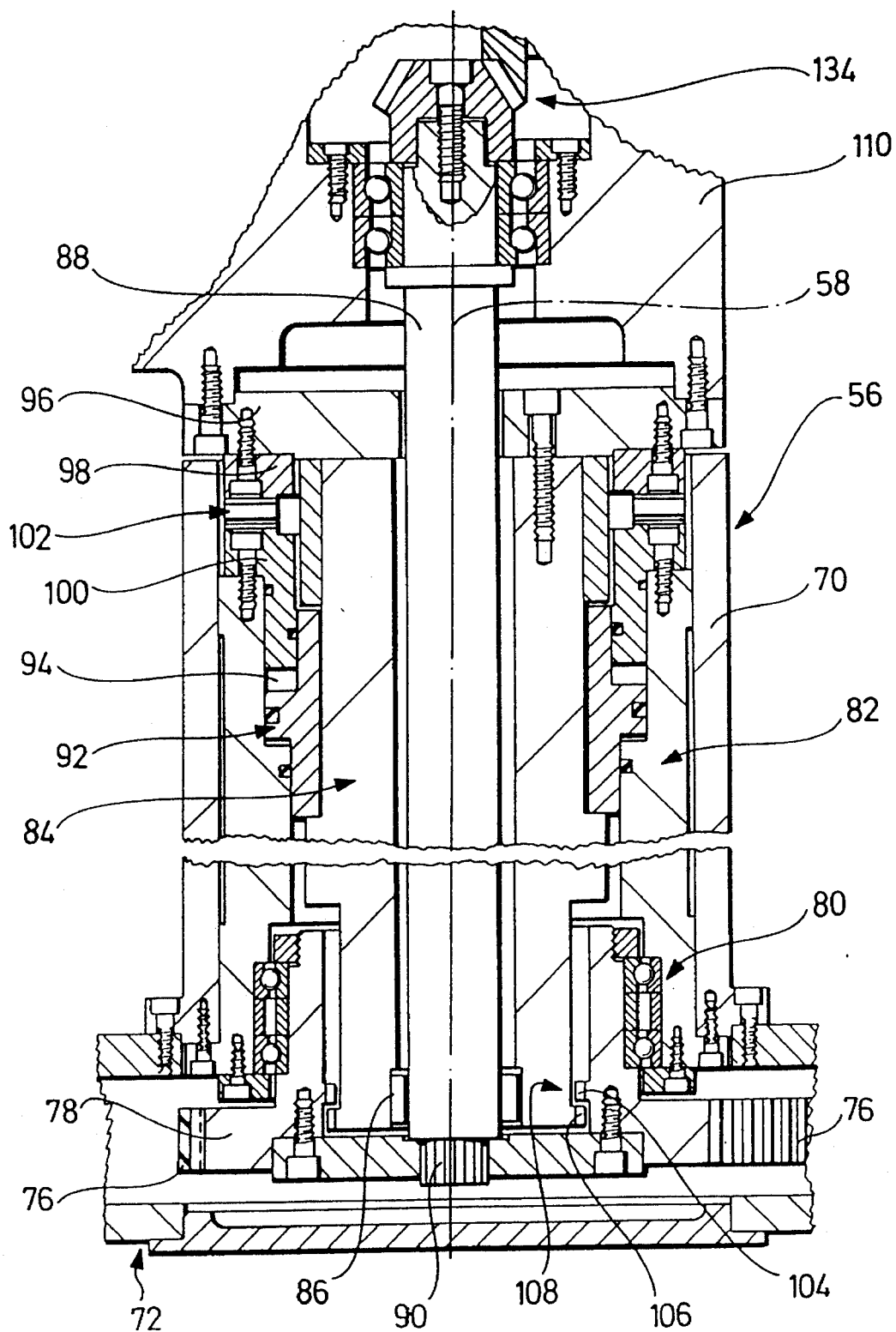
FIG. 10 is a section through the tool carrier slide designed as a sleeve-guided slide and bearing the tool turret according to line 10—10 in FIG. 9.

As is apparent from FIG. 10 in conjunction with FIG. 2, the turret body 110 of a tool turret designated as a whole as 112 is secured to the plate 96 rigidly connected to the turret shaft 84 so that when the turret shaft 84 rotates about the Y-axis 58 the tool turret 112 is swivelled about the Y-axis.

As shown clearly, for example, in FIG. 1, a turret head 114 is mounted on the turret body 110 so as to be rotatable about an indexing axis 116 extending transversely to the Y-axis 58. As is known, the turret head 114 has in each of its stations tool receiving means for equipping with tools aligned radially or axially in relation to the indexing axis 116, whereby the first tool receiving means designated in FIG. 1 as 118 is, for example, a tool receiving means adapted to be equipped with a drivable tool.

On the basis of FIG. 6, the internal construction of the tool turret will now be described insofar as this is necessary for understanding the present invention. In this connection, reference is made to the fact that it has already been state of the art for a long time to derive the indexing drive for the turret head, i.e. the drive for rotating the turret head about its indexing axis, from a drive chain for the driving of tools held in a turret head and so neither the drive of a tool held in a first tool receiving means 118 nor the indexing drive for rotating the turret head 114 about the indexing axis 116 need be explained in detail.

A bearing body 130 is secured in the turret body 110 and this serves to mount a central intermediate shaft 132; this is mounted in the preferred embodiment so as to be coaxial to the indexing axis 116 and axially non-displaceable and is driven by the drive shaft 88 via a miter gear 134. A bevel wheel 138 is held on the intermediate shaft 132 by means of splines 136 so as to be displaceable in axial direction but non-rotatable in relation to the intermediate shaft and this bevel wheel is secured to a bearing 140 also secured in the turret head 114 such that the bevel wheel 138 can be rotated in the turret head 114 but is not axially displaceable in relation thereto.

On the side of the turret body 110 facing away from the turret head 114, the turret body is provided with a second tool receiving means 142 which is mounted in the turret body 110 for rotation about the indexing axis 116 and a drill or a milling tool can, for example, be firmly clamped therein with the aid of customary means which are not, however, illustrated.

Figure 6:
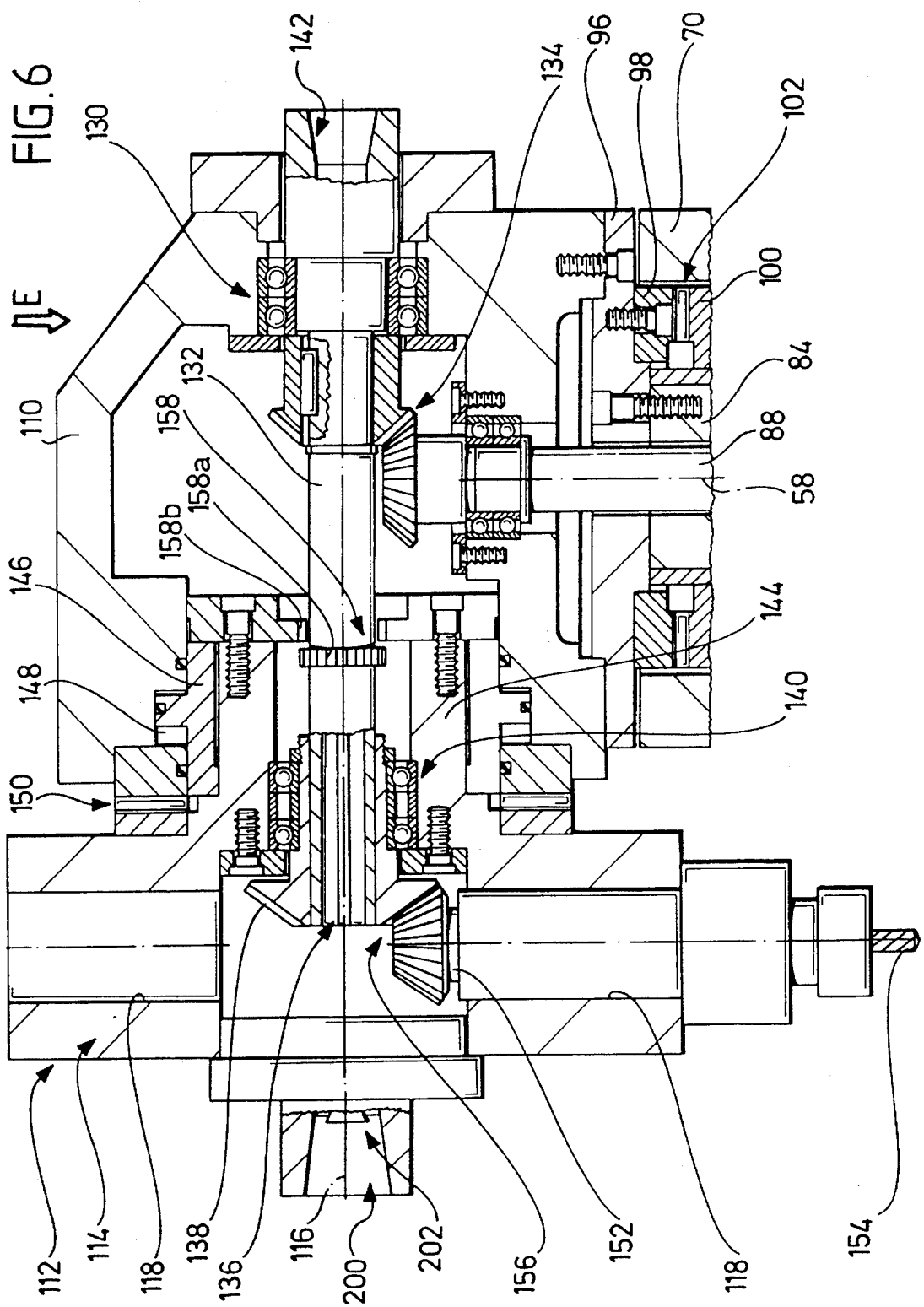
FIG. 6 is a section through the tool turret according to line 6—6 in FIG. 1, whereby a modified version having a central, third tool receiving means on the turret head has, however, been illustrated.

A ring piston 146 surrounding a shaft 144 of the turret head 114 is non-displaceably arranged on this shaft and the turret body 110 forms an annular cylinder chamber 148 for this piston; owing to corresponding pressure-medium connections, which are not, however, illustrated, the ring piston 146 and the cylinder chamber 148 form a double-acting pressure-medium cylinder, with the aid of which the turret head 114, which is rotatable about the indexing axis 116 relative to the turret body 110 and displaceable in the direction of the indexing axis, can be advanced in the direction of the indexing axis 116 out of the locked (secured against rotation) position illustrated in FIG. 6, to the left according to FIG. 6 into an indexing position, in which the turret head 114 is rotatable about the indexing axis 116; moreover, the turret head can be withdrawn back into its locked position in which a HIRTH tooth system 150 is in engagement. The latter is formed by a first toothed ring securely connected to the turret body 110 as well as a second toothed ring securely connected to the turret head 114, these toothed rings engaging in one another in the position illustrated in FIG. 6 and thus preventing any rotation of the turret head 114 relative to the turret body 110.

FIG. 6 shows, in addition, a tool spindle 152 which is intended to be associated with the first tool receiving means 118 (cf. FIG. 1) and is coupled in FIG. 6 with a tool 154, with which the first tool receiving means 118 has been equipped. The tool spindle 152 is driven by the intermediate shaft 132 by means of a miter gear 156 and, therefore, by the drive shaft 88.

If the turret head 114 is intended to be rotated about its indexing axis 116 in order, for example, to bring another of its stations into an operating position, the turret head 114 is displaced with the aid of the ring piston 146 out of the position shown in FIG. 6 and to the left according to FIG. 6 and, in this way, unlocked. At the same time, a coupling 158 is engaged which consists of a first driven coupling half 158a, which is secured to the intermediate shaft 132, and a second coupling half 158b, which is secured to the turret shaft 144, and, consequently, carries out the same axial movements as the turret head 114. When the coupling 158 is engaged, any rotation of the drive shaft 88 leads to a rotation of the turret head 114 about the indexing axis 116.

In accordance with the invention, the miter gear 156 is dimensioned such that a transmission i of approximately 4:1 results between the intermediate shaft 132 and, with it, the second tool receiving means 142 and the tool spindle 152.

In accordance with the invention, the tool turret is provided with a third tool receiving means 200 which is located opposite the second tool receiving means 142 and, in particular, centered in relation to the indexing axis 116. In the illustrated embodiment, the third tool receiving means is located on the turret head 114; it is, however, readily comprehensible that the tool turret could also be designed such that the third tool receiving means is arranged on a region belonging to the turret body 110 which is surrounded in a ring-shaped manner by the turret head 114. A clamping cylinder for securely clamping a tool in the third tool receiving means 200 has not been illustrated for the sake of simplicity.

In the preferred embodiment shown, the third tool receiving means 200 is provided for a non-drivable tool. It is, however, obvious that, in particular when the third tool receiving means 200 is centered on the indexing axis 116, it could also be designed to accommodate a drivable tool since, in this case, an extension of the central intermediate shaft 132 would merely be required.

FIGS. 1 to 4 and 8 show a milling tool 204 inserted into the second tool receiving means 142 whereas FIG. 7 illustrates a boring bar 206 inserted into the third tool receiving means 200.

As shown in FIGS. 1 and 2, a lower slide 210 is displaceably guided on the Z-guide 16 and this slide has guideways 212 which extend in the direction of the X-axis and on which an upper slide 214 is guided. Drives for displacing the lower and the upper slide 210 and 214, respectively, have not been illustrated as they are adequately known. The upper slide 214 bears a customary tool turret 216, the indexing axis 218 of which extends parallel to the axis of rotation 28 and which can also be equipped with drivable tools in order, for example, to work on a workpiece held by the second workpiece clamping device 36. Just as workpieces on both workpiece spindles 18, 30 are intended to be machinable with tools of the tool turret 216, work is also intended to be carried out at both workpiece spindles with tools of the tool turret 112. For this reason, the Z-guide 40 is of such a length that the tool turret 112 can also be displaced into the region of the second workpiece clamping device 36.

Several machining possibilities which the inventive lathe allows will now be explained on the basis of FIGS. 1–5.

Figure 3:
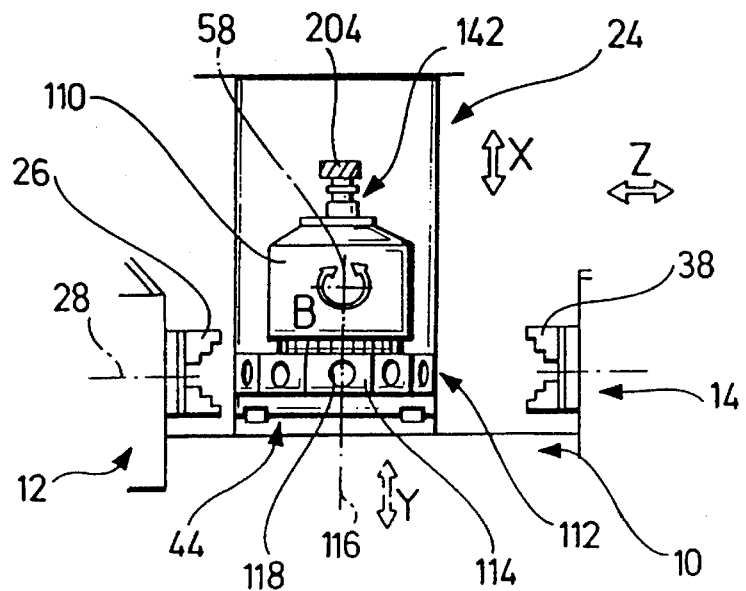
FIGS. 3–5 are three examples for the use of the tool turret of the lathe according to FIGS. 1 and 2.
Figure 4:
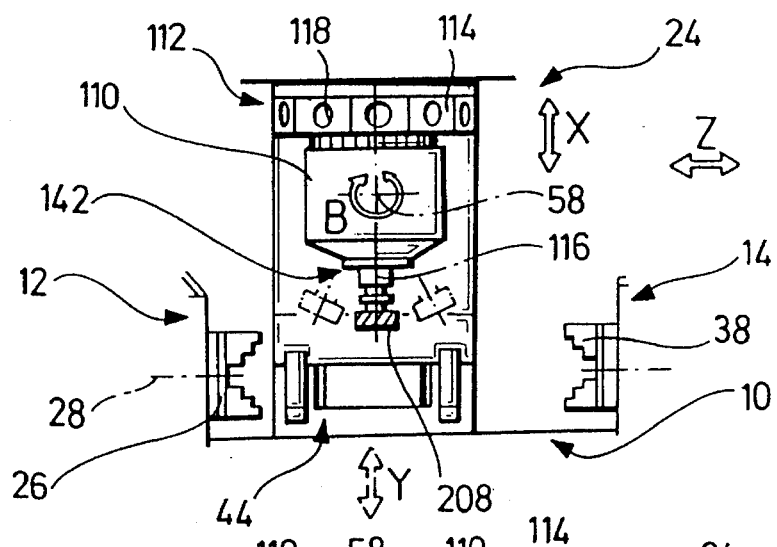
Figure 5:
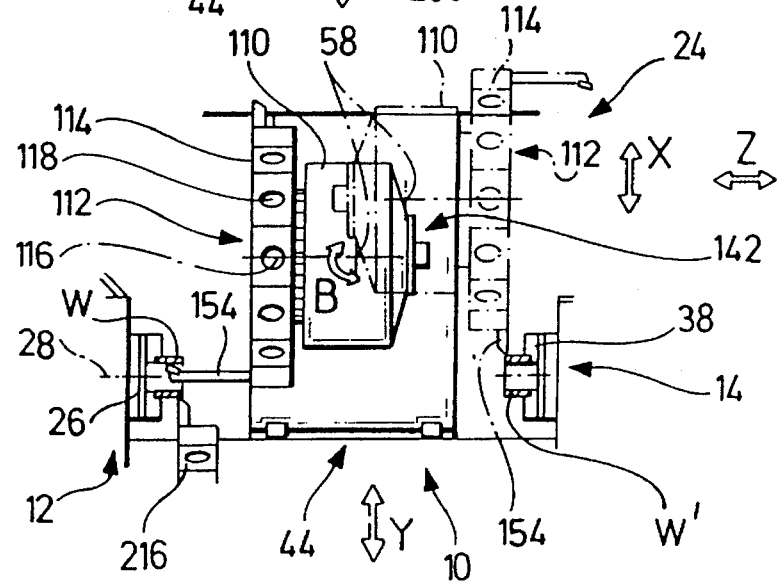

As is apparent from FIG. 1, a workpiece held by the first workpiece clamping device 26 can be machined at the same time with tools of both tool turrets 112 and 216. FIG. 3 shows a situation, in which a workpiece held by the first workpiece spindle 18 or a workpiece held by the second workpiece spindle 30 or both workpieces can be machined simultaneously with tools of the first tool turret 112; it would, for example, be possible to carry out internal turning work on both workpieces at the same time since the second headstock 14 is displaceable in the direction of the Z-axis. FIG. 4 shows the use of the milling tool 204, whereby it has been indicated by dash-dot lines that the milling tool axis need not extend at right angles to the axis of rotation 28. In FIG. 5, two possible positions of the first tool turret 112 have been illustrated with solid or dash-dot lines; in the one position of the tool turret 112 a workpiece W held by the workpiece clamping device 26 is subjected to an internal machining procedure with a boring bar held by the tool turret while external machining work is carried out at the same time on the workpiece W with a lathe tool borne by the second tool turret 216. Following pivoting of the tool turret 112 through 180° about the Y-axis 58, the tools borne by the turret head 114 can be brought into use on a workpiece W' which is held by the second workpiece clamping device 36.

FIGS. 1 and 2 show, in addition, that the milling tool 204 can readily be brought into use on a workpiece held by the second workpiece clamping device 36, with an axis parallel to the axis of rotation 28, such that, for example, gear wheels can be produced by hob-type milling; for this purpose, it is merely necessary to rotate the milling tool 204 and the second workpiece spindle 30 in a controlled coordinated manner about the axis 116 of the second tool receiving means 136 (A-axis) or about the axis of rotation 28 (in this case, at least the second workpiece spindle 30 is provided with a so-called C-axis, i.e. a rotatory feed axis). It has already been mentioned that it is known in CNC lathes to rotate a workpiece spindle about its axis in a controlled manner with respect to the angle of rotation and relatively slowly in order to obtain a C-axis serving as rotational feed axis. If the same drive and control means are provided for the drive motor 74 and the intermediate shaft 132, such a rotational feed axis (A-axis) also results for the second tool receiving means 142 so that by coordinating the two rotatory feed axes or by corresponding interpolation in the machine control the possibility is created of, e.g., producing gear wheels by hob-type milling.

FIG. 8 shows a variation of the lathe according to FIGS. 1 and 2, whereby this variation is provided with a first and a second tool magazine 230 and 232, respectively, which are both designed and arranged such that tools stored in these tool magazines can be collected with the tool turret 112 and returned to the tool magazines again. Tool magazines which hold the tools deposited in them such that they can be removed from the magazine by a tool carrier provided with a tool receiving means but also inserted into the magazine again, are know per se and so it is not necessary to describe the tool magazines 230 and 232 in detail. Each of these two tool magazines has a plurality of tool receiving means 230a or 232a which, in the state illustrated in FIG. 8, hold a boring bar 234, milling tools 236 and 238 as well as a drill 240. These tools can be collected from the tool magazines and returned to them by corresponding displacement or, if necessary, swivelling of the tool turret 112 when the second tool receiving means 142 as well as the third tool receiving means 200 are each provided with a tool clamping device.

Suitable tool clamping devices are known in the most varied constructions and so it is not necessary to describe them in greater detail.

Finally, it will be explained on the basis of FIGS. 11 and 11A how the second tool receiving means of the inventively designed tool turret can be designed and used as a drive coupling means for an auxiliary unit with drivable tool. FIG. 11 shows such an auxiliary unit 250 which can be interchangeably secured to the turret body 110 by means which are not illustrated in detail such that it can, for example, be securely attached in two positions on the turret body 110 which are offset relative to one another through 180° in relation to the indexing axis 116. FIG. 11 illustrates an auxiliary unit designed as a multi-sided turning means. This has a power takeup shaft 252 which is drivable by the second tool receiving means 142 and drives a tool shaft 256 via a toothed-wheel gearing 254. The tool shaft bears a cutter head 258 which is designed in the known manner and with which a plurality of surfaces 262 can be made on a workpiece 260 in the known manner, these surfaces forming a hexagonal cross section in the illustrated embodiment (cf. FIG. 11A). If the combination shown in FIG. 11 of tool turret 112 and auxiliary unit 250 is then envisaged in FIG. 1, a workpiece held by the workpiece clamping device 26 could be machined with the additional unit 250. If it is then envisaged on the basis of FIG. 11 how the auxiliary unit 250 would be pivoted through 180° about the indexing axis 116 once its securing means are released and then secured to the turret body 110 again, the auxiliary unit 250 could be brought into use on a workpiece held by the second workpiece clamping device 36 after the tool turret 112 has been swivelled through 180° about the Y-axis 58.

The above comments show that the inventive lathe makes a 5-axis milling (X, Y, Z, C and B axes) possible without any problems of collision and that by providing this lathe with a so-called A-axis and a roller-contact coupling in the control of the CNC machine (interpolation of the rotary movements about the workpiece axis and about the tool axis) toothed wheels can, for example, be produced in addition by hob-type milling.

I claim:

1. Lathe with a workpiece spindle (18) defining a Z-axis as well as a tool carrier slide (56) bearing a tool carrier in the form of a tool turret (112) having a turret body (110) and a turret head (114), said slide being displaceable in the direction of a first axis (X-axis) extending transversely to the Z-axis, whereby workpiece spindle (18) and tool carrier slide (56) are displaceable relative to one another in the direction of the Z-axis, the tool turret (112) is pivotable about a second axis (Y-axis) likewise extending transversely to the Z-axis as well as transversely to the X-axis and the turret head (114) is mounted on the turret body (110) so as to be rotatable about an indexing axis (116) extending transversely to the Y-axis, and first tool receiving means (118) on the turret head (114) as well as a second tool receiving means (142) borne by the turret body (110) and provided with a drive (74, 88, 132) for a drivable tool (204), characterized in that the second tool receiving means (142) is arranged directly on the turret body (110) on its side facing away from the turret head (114), that the turret head (114) has at least one first tool receiving means (118) provided with a drive (74, 88, 132, 156, 152) for a drivable tool (154) and that a common drive motor (74) is provided for all the drivable tools (154, 204).

2. Lathe as defined in claim 1, characterized in that the second tool receiving means (142) is arranged on the turret body (110) such that a tool (204) held by this second tool receiving means (142) points away from the turret head (114).

3. Lathe as defined in claim 1, characterized in that workpiece spindle (18) and tool turret (112) are displaceable relative to one another in the direction of or parallel to the Y-axis (58).

4. Lathe as defined in claim 1, characterized in that the tool turret (112) is pivotable about the Y-axis (58) through at least 90°.

5. Lathe as defined claim 1, characterized in that the drive (132) for the second tool receiving means (142) has a higher torque than the drive (152) for the first tool receiving means (118).

6. Lathe as defined in claim 1, characterized in that the tool carrier slide (56) is displaceable parallel to the Z-axis (28).

7. Lathe as defined in claim 1, characterized in that the tool carrier slide (56) is displaceable in the direction of the Y-axis (58).

8. Lathe as defined in claim 1, characterized in that a second workpiece spindle (30) is located opposite the first workpiece spindle (18) in the direction of the Z-axis (28), whereby the spindle ends provided with workpiece clamping devices (26, 36) face one another, and that the workpiece spindles (18, 30) are displaceable relative to one another in the direction of the Z-axis (28) such that a workpiece held by one of the workpiece spindles can be taken over by the other workpiece spindle.

9. Lathe as defined in claim 1, characterized in that a second tool carrier (216) is arranged opposite the first tool carrier (112) in relation to the Z-axis (28).

10. Lathe as defined in claim 9, characterized in that the second tool carrier (216) is arranged on a second tool carrier slide (214) displaceable parallel to the Z-axis (28) as well as parallel to the X-axis (46).

11. Lathe as defined in claim 10, characterized in that the two tool carrier slides (56, 214) are adapted to be moved up to each of the two workpiece spindles (18, 30).

12. Lathe as defined in claim 1, characterized in that the tool turret (112) is pivotable about the Y-axis (58) through at least 180°.

13. Lathe as defined in claim 2, characterized in that the second tool receiving means (142) is aligned in the direction of the indexing axis (116).

14. Lathe as defined in claim 13, characterized in that the second tool receiving means (142) is centered on the indexing axis (116).

15. Lathe as defined in claim 1, characterized in that the first tool carrier slide (56) is designed as a sleeve-guided slide guided on a cross-slide system (44) for displacement in the direction of the Y-axis (58) and has at least one part (84) bearing the tool turret (112) and rotatable about the Y-axis (58).

16. Lathe as defined in claim 1, characterized in that a third tool receiving means (200) is provided at least approximately in the center of the turret head (114) or the side of the turret body (110) facing the turret head.

17. Lathe as defined in claim 16, characterized in that the third tool receiving means (200) is centered on the indexing axis (116).

18. Lathe as defined in claim 16, characterized in that the third tool receiving means (200) is non-rotatably arranged on the turret head (114) or the turret body (110).

19. Lathe as defined in claim 1, characterized in that the second tool receiving means (142) is designed as a drive coupling means for an auxiliary unit (250) with drivable tool (258), said unit being securely attachable to the turret body (110).

20. Lathe as defined in claim 8, characterized in that the auxiliary unit (250) is attachable to the turret body (110) in at least two positions offset through 180° in relation to the axis (116) of the second tool receiving means (142).

21. Lathe as defined in claim 1, characterized in that the drive motor (74) is connectable with the turret head (114) via at least one actuatable coupling (158; 108) for rotating the turret head about the indexing axis (116) and/or is connectable with a shaft (84) for swivelling the tool turret (112) about the Y-axis (58).

22. Lathe as defined in claim 1, characterized by an actuatable blocking device (102) for preventing swivelling of the tool turret (112).

23. Lathe as defined in claim 1, characterized in that the drive motor (74) is in drive connection with a drive shaft (88) located in the Y-axis (58) and being, in particular, non-displaceable in relation to the turret body (110), the first and the second tool receiving means (118 and 142, respectively) being drivable via said drive connection as well as via gear wheels (134, 156).

24. Lathe as defined in claim 23, characterized in that the transmission ratio between second and first tool receiving means (142 and 118, respectively) is at least 2 and preferably greater than 2.

25. Lathe as defined in claim 1, characterized in that the second tool receiving means (142) is provided with a tool clamping device.

26. Lathe as defined in claim 16 characterized in that the third tool receiving means (200) is provided with a tool clamping device.

27. Lathe as defined in claim 25, characterized by a tool magazine (230, 232) approachable by the first tool carrier slide (56).

28. Lathe as defined in claim 1, characterized by control means for the continuous and controlled rotary drive of the second tool receiving means (142) as a function of a continuous and controlled rotation of the workpiece spindle (18 or 30).

* * * * *